No. 851,071. PATENTED APR. 23, 1907.
A. C. CREHORE & G. O. SQUIER.
AUTOMATIC TELEGRAPHY.
APPLICATION FILED JULY 12, 1902.
3 SHEETS—SHEET 1.
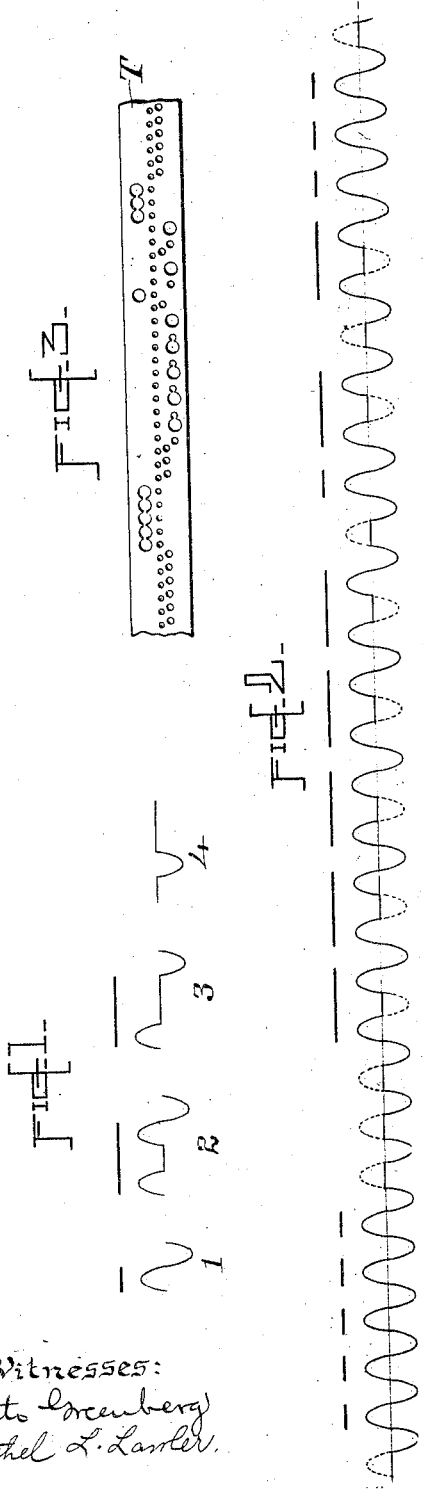
Witnesses:
Otto Greenberg
Ethel L. Lawler
Inventors
Albert C. Crehore
George O. Squier
By Townsend
Attorney

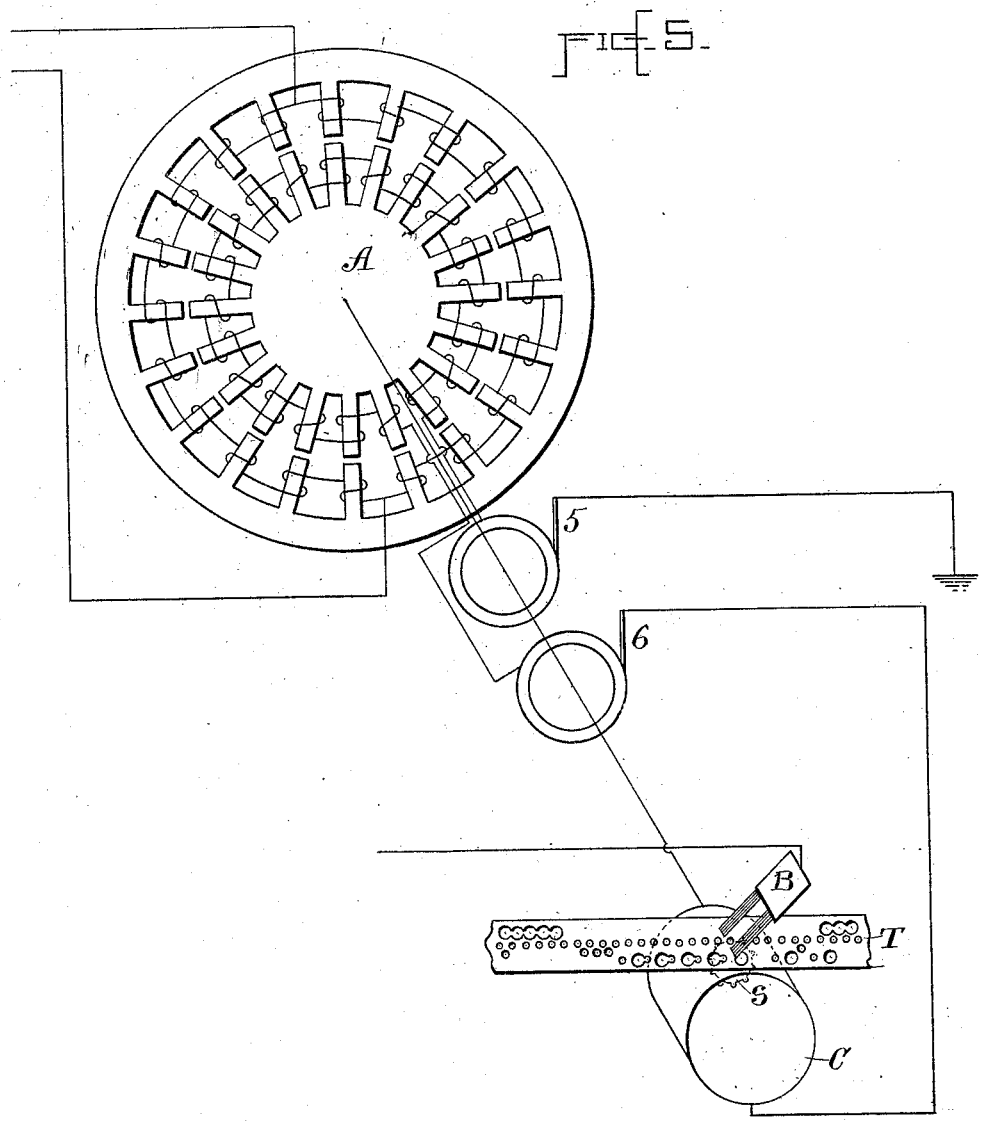

No. 851,071. PATENTED APR. 23, 1907.
A. C. CREHORE & G. O. SQUIER.
AUTOMATIC TELEGRAPHY.
APPLICATION FILED JULY 12, 1902.
3 SHEETS—SHEET 3.
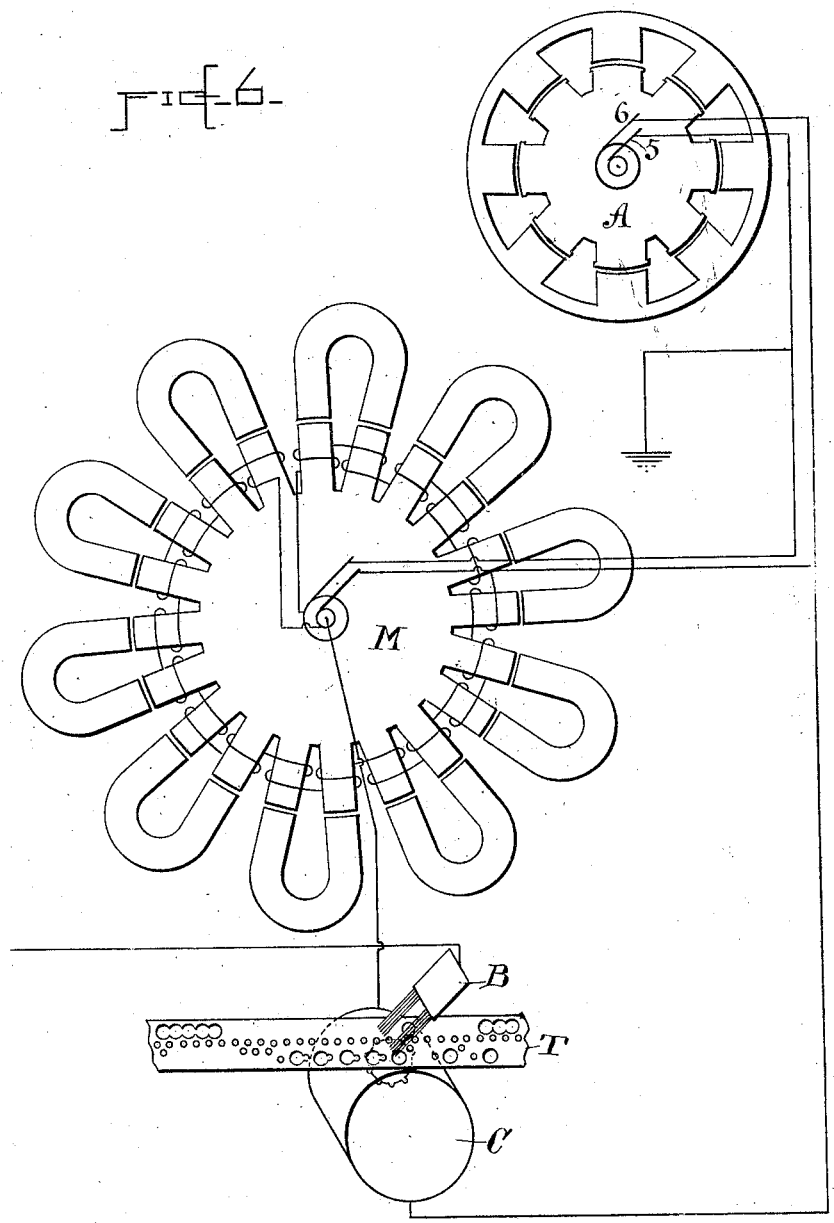

UNITED STATES PATENT OFFICE.

ALBERT C. CREHORE, OF TARRYTOWN, NEW YORK, AND GEORGE O. SQUIER, OF WASHINGTON, DISTRICT OF COLUMBIA.

AUTOMATIC TELEGRAPHY.

No. 851,071.  Specification of Letters Patent.  Patented April 23, 1907.

Application filed July 12, 1902. Serial No. 115,272.

*To all whom it may concern:*

Be it known that we, ALBERT C. CREHORE and GEORGE O. SQUIER, citizens of the United States, and residents, respectively, of Tarrytown, Westchester county, and State of New York, and Washington, District of Columbia, have invented certain new and useful Improvements in Automatic Telegraphy, of which the following is a specification.

The object of the invention is to utilize a single alternating current or sine wave electromotive force from a continuously operating generator to transmit intelligence over a wire in such form as to be readily received by any well known main line relay, either of neutral or polarized form, and to accomplish this result in the most desirable manner, as described in a previous application No. 611,576, filed November 9, 1896, patented April 22d, 1902, No. 698,260, in which the operation upon the alternating waves takes place at the zero points only, and complete semicycles or multiples of a semicycle of the alternating current are suppressed.

For the sake of describing our invention we will assume that the receiver employed is the well known Wheatstone receiver in which, as well understood in the art, a polarized instrument is employed having an armature that may be so adjusted that it will remain on either contact at pleasure, and that requires some force (usually that derived from a current in the coils of the relay) to move it from one position to the other. It also must remain either against one stop or the other and cannot remain in any intermediate position. For an example of such a receiver reference may be had to the work entitled *American Telegraphy, Systems, Apparatus, Operation*, by William Maver, Jr., second edition, New York, 1899, pages 302 to 305, under the head "The Wheatstone Receiver." It is to be understood, however, that our invention while especially applicable for use with a polarized or electromagnetic receiver, is not limited to such use, but may be employed with any kind of receiving instrument of such character that the received signal or indication will be prolonged after its initiation by the positive pulse as hereinafter described, although the succeeding transmitting pulse may be removed from the circuit.

In the accompanying drawings, Figure 1 represents the different elementary waves or combinations of waves employed for transmitting dots, dashes and spaces according to our invention; Fig. 2 shows a combination of waves used to transmit the particular sequence of dots, dashes, spaces, &c. represented by the straight black lines in the figure; Fig. 3 illustrates a transmitting tape adapted to be used to send the combination of waves represented in Fig. 2; Fig. 4 shows the elementary arrangements of perforations suitable for practicing our invention by the use of the tape; Fig. 5 illustrates diagrammatically an arrangement of apparatus embodying the sine wave generator and transmitter with transmitting tape suitable for practicing our invention; Fig. 6 shows a modification in which the transmitter is operated by a synchronous motor.

In the Wheatstone system as heretofore operated, a primary battery or other suitable constant electromotive force is employed as a source of power, and the connection of its poles with the circuit is reversed by the operation of the transmitter. To produce a dot the battery is put to line first with one pole, and then with the other, to produce a complete wave of current. A dash is also a single wave with the positive portion three times as long as the negative. This permits the line to charge to a greater extent for the dash than for the dot, and the employment of dashes consequently retards the speed of transmission. This defect is remedied to some extent but not completely by the use of the compensating capacity and resistance ordinarily inserted in the line, which has the effect of making the dot and dash speeds more nearly equal though the dash is still proportionately the slower. While the two speeds are thus brought more nearly together by this compensation it is done partly at the sacrifice of the dot speed obtainable without the compensation.

In our present system the generator is constantly developing an alternating electromotive force and if connected to line would produce a sine wave alternating current thereon with semicycles of practically uniform duration, and the transmitter is operated in synchronism with said generator, the dash being produced by first transmitting a complete positive sinus or semicycle of the generated current to begin the mark, then suppressing the immediately following negative sinus and transmitting the next positive and following negative sinus in succession, the latter operating to terminate the dash and clear the line. To produce spaces our transmitter is organized to suppress all positive half waves but transmits all those of the opposite polarity produced by the generator. In the preferred apparatus we control the generated current by the action of a tape properly perforated and fed in synchronism with the generating part of the apparatus, the perforations being of proper size, so as, by the duration of contact permitted to the brush, to send any desired number of complete semicycles by closing and opening the circuit at instants when the current would be zero.

Referring to Fig. 1, the combinations of waves employed, according to our invention, for transmitting dots and dashes in the Morse code are represented. A dot is transmitted by a single complete wave of the alternating current including a positive and a negative semicycle. A succession of dots would be transmitted by a succession of complete waves of alternating current. The effect of this upon the receiving relay would be to cause the armature to make contact with one stop for the positive semicycles, say the marking stop, and with the other, say the spacing stop, for the negative semicycles.

When the armature comes against the marking stop the ink-wheel is brought into contact with the paper and a mark is made as long as it remains in contact. The effect, therefore, of sending an alternating current through the coils of this receiver is to produce a series of dots upon the recording tape, having spaces between, approximately equal to the length of the mark. If it is desired to make a dash, the combination represented at 2, Fig. 1, is transmitted. This consists, first, of a positive semicycle, and second, of an omitted negative semicycle; third, a transmitted positive semicycle, and fourth, of a transmitted negative semicycle, the time required for the transmission being equal to four semicycles of the electromotive force. The first effect of this upon the receiver is to bring the armature against the marking stop and the mark upon the tape is begun. It will be observed that the mark will continue to be made upon the tape, the armature remaining where it is left until a spacing or negative impulse of current arrives. This does not happen with the combination of waves employed until the beginning of the fourth period, when the negative impulse is transmitted. This has the effect of terminating the mark and bringing the armature against the spacing stop.

As above described, it is not evident why the third positive semicycle in the dash was transmitted, it being unnecessary for prolonging the dash to the required extent. There is a different reason for this than that required simply to prolong the dash. It is noticed that the transmission line is opened in order to omit the transmission of the second semicycle, which would naturally have been a negative or spacing one, and if the third semicycle had also been omitted the time during which the line remained open would have been twice as long. It is not desirable to keep the line open for a longer time than necessary, on account of the bad effects obtained in duplex working by the differential or by the bridged plan, the opening of said line having a tendency to upset the balance required in duplex working at the distant or receiving end of the line. In many cases where this consideration does not apply, the combination of waves represented at 3, Fig. 1, will transmit the dash just as well as that at 2. This consists, first, of a positive semicycle transmitted and then the immediately following negative and positive semicycles being omitted or suppressed, and finally a negative semicycle transmitted to terminate the dash.

When working a receiver rapidly it is found that it is not best to depend alone upon the natural property of the polarized relay to remain against the stop where it was last left, and in practice it is found that the instrument works a little better if a slight marking bias is given it, that is, a tendency to go over towards the marking side when left at rest.

In order to prevent the armature of the relay from going against the marking stop during times when spaces occur in the transmission, such as that between letters and words, it is found desirable to transmit to the line all of the negative or spacing semicycles, one such unit only being employed between letters, and two or more, as desired, between words, as represented in Fig. 2 where the transmission of three distinct semicycles of negative current is indicated in the space between the five dots at the beginning of the succession of signals and the five succeeding dashes. It will be noticed that if the receiver has a marking bias, it will tend to make a mark when the current is removed between semicycles during a space interval. This would be the case if the line on which transmission were being effected had little or no disturbed capacity, but most ordinary lines where such transmission is desired do have some distributed capacity, and it is this capacity itself which assists in making the record instead of hinders, as in many cases of transmission, for example, when a positive electromotive force is applied to the line as at the beginning of the dash 2, Fig. 1, and is removed at the end of the first semicycle, the current upon the line continues in the positive direction for some time after the removal of the electromotive force, due to this distributed capacity, and thus the receiver actually experiences a positive current which holds it to marking during the second interval when no electromotive force is applied to the line. In the case of 3, Fig. 1, this effect is extended to cover the third interval which is not necessary in the case of 2, Fig. 1, since a positive semiwave is there transmitted. The transmission of the negative semicycle, as the fourth unit, serves in each case to terminate the mark and bring the receiver to spacing. In a similar way when the succession of negative semicycles are transmitted to maintain the receiver armature at spacing, the distributed capacity of the line, in fact, causes the continuous negative or spacing current to flow through the receiver and does not allow the receiver to make a mark between the intervals of negative electromotive force transmitted. This has the advantage of preventing any stray induced current effects from neighboring telegraph wires influencing the receiver during spacing intervals.

Referring to 4, the elementary arrangements of perforations for dot, dash and space respectively in the transmitter tape used with the arrangement of devices shown in Fig. 4, are represented in the three square spaces under respectively, the words "dot," "dash" and "spacing." For the dot there would be the small hole representing the feed-hole, and the large hole against it of sufficient dimensions longitudinally of the tape to transmit one complete wave of the alternating current. For a space there is one small hole, which is the feed-hole, and another hole located to transmit a complete semicycle of spacing current. For the dash four holes are perforated, the two smaller of which are the feed-holes. Of the other two the first one transmits the first positive semicycle of the dash as indicated at 2, Fig. 1, while the space between said hole and the next hole in the tape opens the circuit and thus suppresses the next succeeding negative semicycle, after which the large hole completes the dash by transmitting first the positive and then the negative semicycle as at 2, Fig. 1. It will be observed that in this arrangement the perforations which transmit spacing semicycles are placed on a different horizontal line from those which transmit semicycles used in the production of dashes. Hence the characters on the tape may be much more easily read, and the perforator is simplified.

Referring now to the organization of apparatus indicated in Fig. 5, we have shown diagrammatically a generator of alternating current and a synchronously operated transmitting tape upon which bears a suitable perforated with the combinations of holes shown in Fig. 3, which is adapted to produce signals and spaces such as indicated in Fig. 2, by modifying the alternating current of the generator as indicated by the wavy line in that figure.

Referring to Fig. 5, A represents a generator of alternating or sine wave currents consisting of a revolving armature in a constant field having terminals 5 and 6 consisting of brushes bearing upon collector rings. One terminal 5 of the generator is connected to earth and the other terminal 6 is connected to a platinum-covered cylinder C upon which the brushes B bear in such a manner as to be adapted to make contact through the transmitting tape T. The brush B is connected to line L. In this figure the relative position of the perforations in the tape appears distorted owing to the fact that the tape is shown in perspective. It will be understood, however, that the actual relative position is as shown in the previous figures. The section of transmitting tape transmits five dots, followed by three spaces, and then by five dashes, followed by one space, and then the letter A consisting of a dot, dash, followed by one space, and finally the letter B consisting of a dash and three dots.

The central line of uniformly spaced holes in the transmitting tape is engaged by the pins on the star-wheel S, which star-wheel is directly coupled to the revolving armature of the generator A, and has the requisite number of pins to advance the tape forward a distance equal to that from center to center of consecutive feed-holes while the armature is generating one complete wave of electromotive force, including the positive and negative semicycle.

As represented in Fig. 5, there are ten pins to the star-wheel S and twenty poles in the generator A, and the generator must revolve twice the angular distance from one pole to the next in order to generate a complete wave of electromotive force, and in order to advance the tape T a distance equal to that from center to center of the feed-holes. If, therefore, a hole is perforated in the tape having a diameter approximately equal to the distance from center to center of the feed-holes in such a position that the brush B is allowed to make contact with the cylinder C as the tape passes beneath the brush, it will be noticed that the duration of contact of brush B with the cylinder C lasts for one complete wave and thus transmits a single dot as at 1, Fig. 1. As this dot is to be followed by another dot the next hole Fig. 3, is made of the same size, and adjacent to the first hole, so that for a succession of five dots a succession of five holes is made which cuts away all of the paper or substance of the tape between the holes, allowing the brush which begins to make contact at the beginning of the first hole to remain in contact until it leaves the last hole.

In order to allow for the thickness of the tape employed and for the width of the wires of the brush B, the holes for a dot may be made of slightly larger diameter, the amount being found by measurement, in order that the time during which the brush remains in contact may be made more nearly equal to the complete cycle of current. This effect is quite small in practice, the holes for the dot being made about eleven-hundredths of an inch in diameter, instead of ten-hundredths, which is the distance from center to center of the feed-hole. The next hole made in the tape T, Fig. 3, following the succession of dots is a small hole below the line of feed-holes, just previously to which, however, the brush remains in contact with the paper sufficiently long to cut out the first positive semicycle following the transmission of the last complete wave by which the last of the five dots is transmitted. This hole has a diameter of the proper amount to allow of contact with the brush B, (which is electrically one brush having two arms, one on either side of the feed-holes on the same longitudinal line across the tape,) for a time equal to that of a semicycle, and its position is such that it is the negative or spacing semicycle which is transmitted through it. Then follow two other similar spacing holes each allowing the transmission of a single negative semicycle, thus producing in all three negative semicycles separated from one another by the space of a single positive semicycle and producing a space on the record as indicated in Fig. 2, between the five dots and the five dashes; then follows immediately, in the lower row, first the small and then the large hole of the first dash, this being repeated five times as shown; the final large hole of the last dash is followed by a spacing hole as indicated, immediately preceding which the brush is kept out of contact with the cylinder to eliminate the positive semicycle which follows immediately upon the terminating negative semicycle of the last dash; then comes, on the opposite side of the feeding row of holes, the large perforation which sends a dot, followed immediately by the small and large perforation for the succeeding dash; then comes a spacing perforation after which comes another large and small hole for the dash followed by the perforations on the opposite side of the feeding row of holes which produce the succession of three dots.

Fig. 6 shows a modification in which the tape T is driven by a synchronous motor M, and this synchronous motor, having a permanent magnet field, is operated by the generator A which supplies the current both for driving the motor and for supplying the telegraphic current to the line. This form of transmission is sometimes preferred, on account of the smaller space which the synchronous motor occupies in a telegraph office. The arrangement permits the generator A to be placed at any convenient point and enables one to employ an ordinary commercial alternating current for the purposes of telegraphy.

The invention claimed is—

1. A perforated tape for telegraph transmission, having spacing and character perforations distinguished from one another by being located on different longitudinal lines combined with a generator and transmitter adapted to transmit currents over the line by the said spacing perforations.

2. In a telegraph apparatus, the combination with a generator of alternating current, of a transmitting apparatus synchronously driven and adapted as described to send dashes or prolonged signals by permitting first a semicycle of one polarity of current to go to line, then omitting a semicycle of the opposite polarity, then sending a semicycle of the same polarity as that first transmitted and terminating the signal by a semicycle of the opposite polarity.

3. In a telegraph apparatus, the combination substantially as described, of an alternating current generator and a synchronously operating transmitter having a transmitting tape perforated in the manner described to transmit and terminate a dash by sending first a positive semicycle of the generated alternating current, omitting the next or negative semicycle, then transmitting the next positive semicycle and finally a negative semicycle, as and for the purpose described.

4. In a telegraphic apparatus, the combination substantially as described with a continuously operating alternating current generator, of a transmitting apparatus synchronously operated and organized to transmit and terminate dashes or prolonged signals in the time of four complete semicycles by sending first a semicycle of one polarity and finally a semicycle of the opposite polarity, one or both of the two intermediate semicycles being omitted, as and for the purpose described.

5. The improvement in methods of telegraphing by an alternating current generator, consisting in producing prolonged spacing by sending a succession of semicycles of one polarity and omitting intermediate semicycles of the opposite polarity, as and for the purpose described.

6. In a telegraph apparatus, the combination with a generating apparatus adapted to produce pulses of current of opposite polarity, of a synchronously operating transmitter adapted to send dots or short signals by transmitting to the line a semicycle of one polarity followed immediately by a semicycle of the opposite polarity and to transmit dashes or prolonged signals by sending to the line first a semicycle of one polarity, then suppressing the current for the time of the next succeeding pulse of current produced by the generator, and finally in the time of the fourth pulse transmitting a pulse of the opposite polarity to that first sent.

7. In a telegraph apparatus, the combination with an alternating current generator, of a transmitting tape organized to send dots by permitting a complete wave of the alternating current to go to line, and to transmit dashes or prolonged signals in the time of two complete waves by sending the first semicycle of the first wave and the last semicycle of the second wave, the corresponding semicycle of the first wave being omitted.

8. In a telegraph apparatus, the combination with means for generating a regularly recurring series of current pulses positive and negative, of a synchronously operating transmitter controlling the flow of said pulses to line and operating in the manner described to transmit dots by sending a pulse of one polarity followed immediately by a pulse of the opposite polarity, and to send dashes or prolonged signals in double the time of the short signals or dots by transmitting a pulse of one polarity and in the time of the fourth pulse transmitting a pulse of the opposite polarity, the current being removed from the line in the time of one or both of the two intermediate pulses.

9. The herein described method of telegraphing by an alternating current generator, consisting in sending a prolonged signal by first permitting a pulse of said generator of one polarity to flow to line, then suppressing pulses to cause the signal to be lengthened by the charge produced by the initial pulse, and finally permitting a pulse of said generator of the opposite polarity to the initial pulse to flow in order to terminate the signal.

10. The herein described method of transmitting lengthened signals from an alternating current generator, consisting in permitting a pulse of one polarity to flow to line from said generator, winding up the signal by permitting a pulse of the opposite polarity to flow to line from said generator and omitting one or more of the intermediate pulses between the initial pulse and final pulse and of the same character as the initial pulse for the purpose of prolonging the action on the receiver by the action of the charge on the line produced by the initial pulse flowing from said generator.

Signed at New York, in the county of New York and State of New York this 26th day of June A. D. 1902.

ALBERT C. CREHORE.
GEORGE O. SQUIER.

Witnesses:
J. GALLWITZ,
E. L. LAWLER.